Nov. 11, 1947.  L. C. FETTERLY  2,430,632
PREPARATION OF A TUNGSTEN SULFIDE CONTAINING CATALYST
Filed Aug. 29, 1944
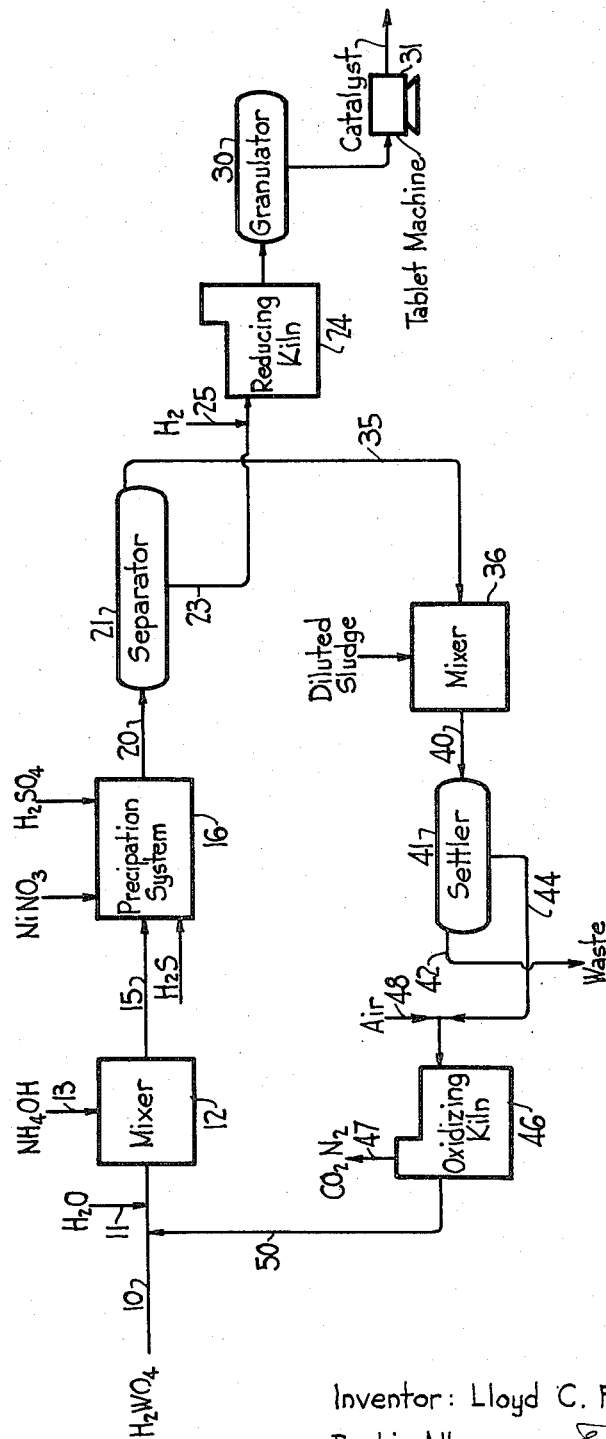
Inventor: Lloyd C. Fetterly
By his Attorney:

Patented Nov. 11, 1947

2,430,632

UNITED STATES PATENT OFFICE 2,430,632

PREPARATION OF A TUNGSTEN SULFIDE CONTAINING CATALYST

Lloyd C. Fetterly, Long Beach, Calif., assignor to Shell Development Company, San Francisco, Calif., a corporation of Delaware Application August 29, 1944, Serial No. 551,749

2 Claims. (Cl. 252—254)

The present invention relates to a process for the recovery of metal values from materials containing the same and more particularly to the recovery of metals of the left sub-group of group VI of the periodic table according to Mendeleeff.

In the preparation of catalysts and the like from metals of the left-sub-group of group VI of the periodic table, namely chromium, molybdenum, tungsten, and uranium, it is often found that the effluent or waste water contains considerable and valuable amounts of these metals. This is particularly true in the case of tungsten, which is commonly employed as a dehydrogenation or hydrogenation catalyst in combination with nickel and sulfur. Such tungsten-nickel-sulfur catalysts are prepared by dissolving soluble tungsten acid in ammonium hydroxide and converting the same to ammonium thiotungstate by reaction with excess hydrogen sulfide. This solution containing dissolved hydrogen sulfide is mixed with a nickel solution whereby a nickel sulfide precipitate is formed in the mixture. Tungsten sulfide is then precipitated from the mixed solutions by the addition of sufficient quantities of an acid, for instance, 25% sulfuric acid. The precipitated mixed sulfides are then separated from the solution, washed to remove ammonium sulfide, if desired, and roasted in a partially reducing atmosphere, whereby a highly active catalyst is obtained. However, in spite of considerable care, considerable amounts of tungsten are generally found in the acidic solution remaining after the precipitated mixed sulfides are removed, and in the wash water.

It is therefore an object of the present invention to provide a process for the recovery of metals of the left sub-group of group VI of the periodic table from materials containing the same.

Another object of this invention is to provide a process for the recovery of valuable amounts of tungsten from waste acidic aqueous solutions containing the same.

A further object is to provide a cyclical process of manufacturing tungsten-nickel-sulfide catalyst, wherein tungsten is substantially completely removed from the effluent water and recycled to the first step of the catalyst preparation in a highly economical and efficient manner.

Other objects and advantages of the present invention will be readily apparent from the following description, taken in reference to the drawing, which represents a schematic flow diagram of the tungsten-nickel-sulfide catalyst preparation and tungsten recovery and recycle process of the present invention.

Briefly, the present method of recovery of metals of the left sub-group of group VI of the periodic table from waste water and the like comprises treating the metal-containing liquid with water-soluble quinoline type nitrogen base compounds derived from cracked distillate acid sludge to cause formation and separation of precipitates of the metal salts of said nitrogen bases. Thereafter, the metal salts are separated and converted to the inorganic metal compounds.

For purposes of illustration, the process will be described in more detail in relation to the recovery of tungsten from waste water effluent as part of the process of preparing tungsten-nickel-sulfide catalyst by the wet method.

Tungstic acid is dissolved in aqueous ammonia to form a solution of ammonium tungstate. A suitable procedure in preparing the solution is to suspend the tungstic acid in plain water with stirring and then add aqueous ammonia. Certain commercial tungstic acids are most readily dissolved by this procedure. When soluble tungstic acid is used, however, the order of adding the ingredients is immaterial. The ammonium tungstate is then converted to ammonium thiotungstate by reaction with hydrogen sulfide. The hydrogen sulfide may, if desired, be simply bubbled into the liquid in an open container. It is preferable, however, to react the solution with hydrogen sulfide in a closed pressure-tight vessel, preferably provided with stirring means. In order to form ammonium thiotungstate rather than ammonium di-thiotungstate, the temperature is preferably maintained somewhat above about 35° C. This condition is ordinarily provided automatically by the heat of reaction. Excess ammonium sulfide is preferably present in this solution.

A second solution containing a soluble nickel salt is added to the ammonium thiotungstate solution whereupon nickel sulfide (and possibly small amounts of nickel thiotungstate) is precipitated. Most of the remaining tungsten is then precipitated from the solution as tungsten trisulfide by the addition of an acid, for instance, 25% sulfuric acid. The acid is preferably added until the pH of the liquid is between about 1 and 2, since tungsten trisulfide is soluble in less acidic solutions, while nickel sulfide is soluble in more acidic solutions. If desired, the acid may be combined with the solution of the nickel salt before it is added to the ammonium thiotungstate solution. Preferably, the solution of ammonium thiotungstate and acid solution of the nickel salt are continuously mixed in small streams to effect a continuous coprecipitation.

Thereafter, the precipitated sulfide mixture is separated from the acidic aqueous solution. The separated mixed sulfide may be washed with water to remove soluble salts, such as ammonium sulfate, the wash water preferably being combined with acidic aqueous solution separated from the precipitated sulfides. The precipitated sulfide mixture is dried and then heated, for example in a rotating drum at a temperature of about 250° C.–450° C. in the presence of a stream of hydrogen or a mixture of hydrogen and hydrogen sulfide. The heat treatment is continued for a long enough period to reduce the tungsten trisulfide to the disulfide and to produce a catalyst material which may be readily compressed into pellets for use.

The acidic aqueous solution separated from the precipitated sulfides together with wash water, if any, is treated with water-soluble quinoline compounds to form a separable precipitate of the tungsten salt of alkylated quinoline.

The water-soluble quinoline compounds are alkylated quinolines having relatively short alkyl side chains, such as dimethyl, trimethyl, methyl ethyl, diethyl, methyl butyl, etc., obtained as nitrogen bases from cracked hydrocarbon distillates. The quinoline compounds may be used as the free bases or salts. The preferred precipitant, containing the quinoline compounds, is prepared by diluting acid sludge obtained in the sulfuric acid treatment of cracked hydrocarbon distillates (e. g. pressure distillate). Usually the dilution with water is carried to a gravity of between about 25° and 35° Bé. for the aqueous phase, after which the oil layer is removed before using the precipitant. It has been found that the presence of about 20% entrained oil prevents the separation of heavy tarry material on dilution of acid sludge. It is highly desirable to use fresh acid sludge to reduce further the possibility of separation of tarry material.

The alkylated quinoline nitrogen base compounds, e. g. the sulfuric acid salt, contained in the aqueous phase of diluted cracked distillate acid sludge, are added to the effluent water (i. e. the combined acidic aqueous solution and wash water), which should be warmed to about 100–140° F. Conveniently the mixture is agitated for about 5 to 10 minutes. The water-soluble quinoline compounds are used in a slight excess over an equimolal ratio to the tungsten present in the water.

After allowing the precipitate to settle, say 30 minutes, or 1 hour or longer, the precipitate may be placed on a filter and water washed, or else the precipitate is separated from the supernatant liquid by decantation, washed by decantation, and heated at about 200 to 212° F. for 10 to 15 minutes or more. By using the latter preferred method and thereafter settling for about 15 minutes or more, better coagulation and larger particle size and thereby a more compact precipitate or filter cake are obtained.

The filter cake of tungsten salt of the alkylated quinolines is then oxidized to convert the salt to inorganic tungsten compounds, such as the acid or oxide. The oxidation may be carried out by burning directly; or by heating to about 700° F.–800° F. or higher in the presence of oxygen; or by the use of suitable strong oxidizing agents such as aqueous solutions of chlorates, perchlorates, dichromates, permanganates, nitro acid, etc.; or by treating with hydrogen peroxide or tertiary butyl hydroperoxide; or by passing a stream of ozone through an aqueous suspension of the tungsten precipitate.

The use of oxidation catalysts are particularly effective in carrying out the conversion of the alkylquinoline tungstate. Thus, it has been found that by heating the alkylquinoline tungstate with concentrated sulfuric acid containing a trace of an oxidation catalyst, such as selenium oxide, (Kjeldahl catalyst), copper sulfate, ferric sulfate, mercuric sulfate, bismuth nitrate, etc., the quinolines are rapidly and completely oxidized and a precipitate of the yellow tungstic acid ($H_2WO_4$) settles out easily. Besides tungstic acid, the products of oxidation are $NH_3$, $CO_2$, $SO_2$, and $H_2O$. The excess acid and catalyst can be used continuously with minor make-up until the concentration of ammonium bisulfate substantially reduces the power of oxidation. A temperature of slightly below the boiling point of sulfuric acid is generally most desirable. In addition to the advantage that the tungstic acid so produced is readily soluble in aqueous ammonia, this method of oxidation is usually preferred from the standpoint of material cost, required equipment, and simplicity.

Another advantageous procedure, which may be used for the conversion of the alkylquinoline tungstate, comprises fusing with solid alkali, such as solid sodium hydroxide. The alkylquinolines will distill from the caustic melt while tungsten reacts with the caustic to form $Na_2WO_4$. Tungstic acid is readily obtained from this melt by acidification.

The recovered tungsten, preferably in the acid form, may be returned as an aqueous suspension to the ammonium salt conversion step, if desired. When the tungsten has been recovered as the oxide, it usually is preferable to treat with strong acid to form tungstic acid, whereby on recycling the tungstic acid is converted to the ammonium salt. However, when tungsten oxide is obtained, such as, by burning of the organic tungstate, it may be introduced as a suspension of the oxide into the ammonium salt conversion step, whereby it is converted to the sulfide in the subsequent treatment with hydrogen sulfide.

As will be noted, in the process of the present invention two types of waste products, namely, waste water from catalyst preparation and waste diluted acid sludge, are combined to yield a valuable amount of recovered tungsten or like metal.

Referring now to the drawing, a preferred embodiment of the present process as applied to the preparation of tungsten-nickel-sulfide catalyst and recovery of tungsten from the effluent water will be described. For simplicity, the drawing does not show pumps, stirrers, surge tanks, heating elements, valves, by-passes, vents, condensers, coolers, and other auxiliaries, the proper placement of which will be at once evident to those skilled in the art.

Tungsten in the form of tungstic acid ($H_2WO_4$) is introduced through line 10 along with water from line 11 into a stirred vessel or mixer 12 in order to obtain an aqueous suspension of tungstic acid. Gaseous ammonia, or preferably aqueous ammonia of, for example, 10–35%, and especially 28% strength, is introduced into mixer 12 through line 13, whereupon the tungstic acid is converted to ammonium tungstate. When using soluble tungstic acid, the order of adding the ingredients at this stage is immaterial. However, when using less soluble tungstic acid, it is preferable to add the aqueous ammonia to the aqueous suspension of tungstic acid.

Ammonium tungstate from mixer 12 is transferred through line 15 to a precipitation system 16 which may comprise a closed vessel or a series of vessels or tanks. Into the ammonium tungstate solution in the precipitation system 16 is introduced hydrogen sulfide while stirring to form ammonium thiotungstate [$(NH_4)_2WS_4$]. The temperature should be kept higher than about 35° C. in order to minimize the formation of the dithiotungstate [$(NH_4)_2WO_2S_2$]. This will ordinarily be taken care of automatically, since there is a considerable evolution of heat during the addition of the hydrogen sulfide. An excess of hydrogen sulfide is usually added.

Thereafter nickel nitrate and sulfuric acid, either separately or together, are introduced into the precipitation system 16. Thus, the nickel nitrate may be added as a concentrated solution with continuous stirring, whereby a black precipitate is formed. The tungsten is then precipitated as the sulfide by the addition of suitable acids such as sulfuric acid of, for example, 25% strength. The acid is added to the slurry until the pH of the liquid is between 1 and 2. Preferably the slurry is stirred for a short time, say, half an hour.

Thence the aqueous slurry of mixed sulfides of tungsten and nickel is passed through line 20 to separator 21, wherein the precipitate is separated from the acidic aqueous liquor. The separator 21 may comprise settlers, wash towers, filters, centrifuges and the like. Because of the fine, almost colloidal, state of the precipitate, filtration is very slow. Centrifuges of the imperforate basket type in which the precipitate collects on the outside wall and the liquor is removed near the center, are particularly suited to this separation of the dense metal sulfide from the aqueous liquor. Washing of the precipitate should generally be kept at a minimum since there is a tendency for the semi-colloidal tungsten sulfide to become peptized and thus pass into the wash water. In any case, the wash water should be combined with the liquor (i. e. the filtrate) separated from the precipitate for recovery of the tungsten therefrom.

The separated precipitate of mixed sulfides is treated in any suitable manner for preparation of catalyst. For example, the mixed sulfides which may contain some water and which are withdrawn through line 23 from the separator 21 may be charged to a reducing kiln 24 for drying and roasting. The drying is usually carried out at about 100° C. and the roasting at 350°–500°, preferably at 400–420° C. During the roasting stage for reduction of the tungsten trisulfide to tungsten disulfide, hydrogen along with other gases, if desired, such as hydrogen sulfide, nitrogen, other inert gases, etc., may be introduced into the kiln 24 through line 25. By predrying at the lower temperature, less gas is used for the reduction.

Thereafter, the roasted catalyst may be comminuted in a granulator 30 and then formed into pellets in a tablet machine 31.

The acidic aqueous liquor separated from the precipitate of mixed sulfides in the separator 21 usually contains at least 0.8% of the tungsten charged. This liquor together with wash water, if any, is passed from the separator 21 through line 35 to a stirred vessel or mixer 36 wherein is added water-soluble alkylated quinoline nitrogen base compounds, such as preferably 1:1 diluted pressure distillate acid sludge, in sufficient amount to precipitate the tungsten. For example, 2 to 10 volumes, and preferably about 6 volumes of said diluted sludge is added per 100 volumes of effluent water or separated aqueous liquor containing about 1% of tungsten.

The precipitate formed by the reaction of the quinoline compounds with the tungsten is transferred through line 40 to a settler 41 for settling for at least 30 minutes, preferably about one hour. Then, the supernatant waste liquid is withdrawn through line 42 and discarded. The precipitate may then be heated at about 80–150° C. for 10 to 25 minutes or more. This may be accomplished by introducing live steam into the precipitate slurry. However, the heating is preferably applied externally to a container of the precipitate. The precipitate may then be water washed with agitation and the wash water disposed of through line 42.

The slurry of the alkylated quinoline tungstate precipitate, which contains a considerable amount of water, e. g. about 60%, is withdrawn from the settler 41 through line 44 and is charged to an oxidizing kiln 46. Therein, the organic portion of the precipitate is burned off and passes out the top vent 47 of the kiln 46 as $CO_2$ and $N_2$. Air or the like oxidizing gas is introduced into the kiln 46 through line 48 to facilitate the oxidation, which proceeds readily with air at, for example, a temperature of about 800° F.

Instead of oxidizing with air at a high temperature in a kiln, other means may be provided to cause oxidation of the tungsten precipitate to tungstic acid or oxide. For example, the precipitate may be treated with concentrated sulfuric acid together with an oxidation catalyst, e. g. selenium, or by fusing with solid caustic, as heretofore discussed.

After oxidation, the recovered tungsten is passed through line 50 to tungsten feed line 10 for recirculation through the catalyst precipitation steps.

As an example of the recovery of tungsten from effluent water separated from precipitate of mixed sulfides of tungsten and nickel, the following is given: One and one-half gallons of the aqueous phase of 1:1 diluted sludge obtained in the sulfuric acid treatment of cracked petroleum distillate were added to 25 gallons of warm effluent water (100–140° F.), which contained about 1% tungsten, and the mixture was agitated for 5 to 10 minutes. After standing for one hour, the volume of the precipitate occupied about 10% of the original effluent volume. This precipitate was separated from the supernatant liquid by decantation, water washed by decantation, and heated at 200–212° F. for 10 minutes. After 15 minutes settling, the precipitate was reduced to approximately 0.15% of the original effluent volume. The precipitate was then burned to tungsten oxide in a kiln at 800° F. with the introduction of air.

As illustrative of an alternate preferred method of oxidizing the organic tungstate salt, the following experiment was performed: To 100 ml. of concentrated sulfuric acid containing 0.1 gm. of selenium was added 1.00 gram of alkylquinoline tungstate. After heating at near-boiling for 30 minutes, the oxidation of the salt and the precipitation of tungstic acid was complete. Another 1.00 gram sample of the salt was added to this acid with the same results.

I claim as my invention:

1. In a process of producing a tungsten sulfide-containing catalyst by chemical precipitation of tungsten sulfide in an acidic aqueous solution from a solution containing a tungstate compound dissolved therein and separating the tungsten sulfide precipitate from the acidic aqueous solution and residual unprecipitated tungstate compound, the improvement comprising contacting the separated acidic solution containing residual tungstate compound with an alkylquinoline compound and thereby forming a precipitate of an alkylquinoline tungstate, separating the alkylquinoline tungstate precipitate, heating said separated alkylquinoline tungstate in concentrated sulfuric acid containing a selenium oxidation catalyst and thereby converting the tungsten therein to tungstic acid and the alkylquinoline portion thereof to volatile decomposition products, recovering said tungstic acid and recycling it for conversion to tungsten sulfide.

2. In a process of producing a tungsten-nickel-sulfide catalyst by chemical precipitation of mixed sulfides of tungsten and nickel from an acidic aqueous solution containing a soluble nickel salt and a tungstate compound and separating the resulting tungsten-nickel-sulfide precipitate from the acidic aqueous solution and residual unprecipitated tungstate therein, the improvement comprising contacting the separated acidic aqueous solution containing residual tungstate therein with an alkylquinoline compound and thereby forming a precipitate of an alkylquinoline tungstate compound, separating the alkylquinoline tungstate precipitate, heating said separated alkylquinoline tungstate in concentrated sulfuric acid containing a selenium oxidation catalyst and thereby converting the tungsten therein to tungstic acid and the alkylquinoline portion thereof to volatile decomposition products, recovering said tungstic acid and recycling it for conversion to tungsten-nickel-sulfide catalyst.

LLOYD C. FETTERLY.

REFERENCES CITED

The following references are of record in the file of this patent:

UNITED STATES PATENTS

| Number | Name | Date |
|---|---|---|
| 1,948,408 | Watts et al. | Feb. 20, 1934 |
| 2,035,583 | Bailey | Mar. 31, 1936 |
| 2,105,665 | Lazier et al. | Jan. 18, 1938 |
| 2,227,672 | Pier et al. | Jan. 7, 1941 |

OTHER REFERENCES

Guglialmelli, "Tungstic and Molybdic Compounds as Precipitating Reagents for Certain Basic Organic Compounds," Chemical Abstracts, vol. 13, page 215, 1919.

Analytical Chemistry, Treadwell and Hall, vol. II, Quantitative, 7th ed., 1930, pages 269 and 270.